United States Patent
Truong et al.

(10) Patent No.: US 11,755,547 B1
(45) Date of Patent: Sep. 12, 2023

(54) VERIFICATION MICROSERVICE FOR DEDUPLICATED OBJECT STORAGE SYSTEM

(71) Applicant: EMC IP Holding Company LLC, Hopkinton, MA (US)

(72) Inventors: Tipper Truong, San Jose, CA (US); Joseph Brandt, Salt Lake City, UT (US); Philip Shilane, Newtown, PA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 16/912,990

(22) Filed: Jun. 26, 2020

(51) Int. Cl.
*G06F 16/215* (2019.01)
*G06F 16/23* (2019.01)

(52) U.S. Cl.
CPC .......... *G06F 16/215* (2019.01); *G06F 16/2365* (2019.01)

(58) Field of Classification Search
CPC .......... G06F 16/215; G06F 16/2365
See application file for complete search history.

(56) References Cited

U.S. PATENT DOCUMENTS

| | | | |
|---|---|---|---|
| 9,152,353 B1* | 10/2015 | Wang et al. | G06F 11/1435 |
| 10,795,859 B1* | 10/2020 | Wallace | G06F 16/137 |
| 2011/0055170 A1* | 3/2011 | Mark | G06F 16/10 707/699 |
| 2014/0325259 A1* | 10/2014 | Resch et al. | G06F 11/1004 714/6.2 |
| 2016/0267099 A1* | 9/2016 | Huang | G06F 3/067 |
| 2019/0243547 A1* | 8/2019 | Duggal et al. | G06F 3/0619 |
| 2020/0310964 A1* | 10/2020 | Lu et al. | G06F 3/0604 |

* cited by examiner

*Primary Examiner* — Taelor Kim
(74) *Attorney, Agent, or Firm* — Dergosits & Noah LLP; Todd A. Noah

(57) ABSTRACT

Described is a system for detecting corruption in a deduplicated object storage system accessible by one or more microservices while minimizing costly read operations on objects. A similarity group verification path is selected by a controller module based upon detection of an object storage memory size condition. The similarity group verification path includes controller phases to verify whether objects have been corrupted without having to incur costly read operations.

21 Claims, 15 Drawing Sheets

(Worker Node in Similarity Group Verification Path)

712

714
initiate a record_sgs phase to verify existence of corruption by determining whether a first fingerprint and corresponding segment size array in metadata of a similarity group is consistent with a compression region name in the metadata of the similarity group, the similarity group loaded into memory of the worker node 716
initiate a verify_sr_to_sg phase to verify existence of corruption by determining whether a second fingerprint and corresponding segment size array in metadata of a slice recipe is consistent with the first fingerprint and corresponding segment size array in the metadata of the similarity group stored in the memory of the worker node 718
track instances of corruption to be sent to a controller

FIG. 7B

VERIFICATION MICROSERVICE FOR DEDUPLICATED OBJECT STORAGE SYSTEM

TECHNICAL FIELD

This disclosure relates to deduplication systems, and more particularly, to relationship between data stored within deduplication systems.

BACKGROUND

In computing, a data storage system is a key component to store data for computation and transferring. Data files generally contain redundant data. For example, an email file may contain email threads that earlier emails are copied multiple times in the later replies. In an enterprise setting, many versions of the same information are stored for record keeping. Storing data files like these without modification wastes storage space and data deduplication is a way to reduce data redundancy in a storage system.

In a deduplication system, unique pieces of data, or byte patterns, in a file are identified as "chunks," and they are stored during a process of analysis of the file. The analysis goes through the file, and other chunks are compared to the stored copy and whenever a match occurs, the redundant chunk is replaced with a small reference that points to the stored chunk. Because the same byte patterns may occur many times in a file, the amount of data that must be stored is greatly reduced.

Several factors affect deduplication efficiency. The amount of reduction of storage depends heavily on the distribution of the duplication within a file. The size of chunks also affects the reduction. A smaller chunk size saves more storage as it enables the system to identify more duplicates. However, a smaller chunk size increases the size of metadata, deduplication time, and fragmentation. Thus, the chunk size selection is a trade-off decision to a deduplication system. Another factor affecting the deduplication efficiency is how a file is divided up for deduplication. Ideally a file should be divided up in a way to maximize the possibility of finding duplicates. In a deduplication system, a file is divided up into data blocks, which are the units of deduplication.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

FIG. 7B is a flow diagram illustrating an example method according to one or more embodiments of the disclosure.

DETAILED DESCRIPTION

Figure 1A:
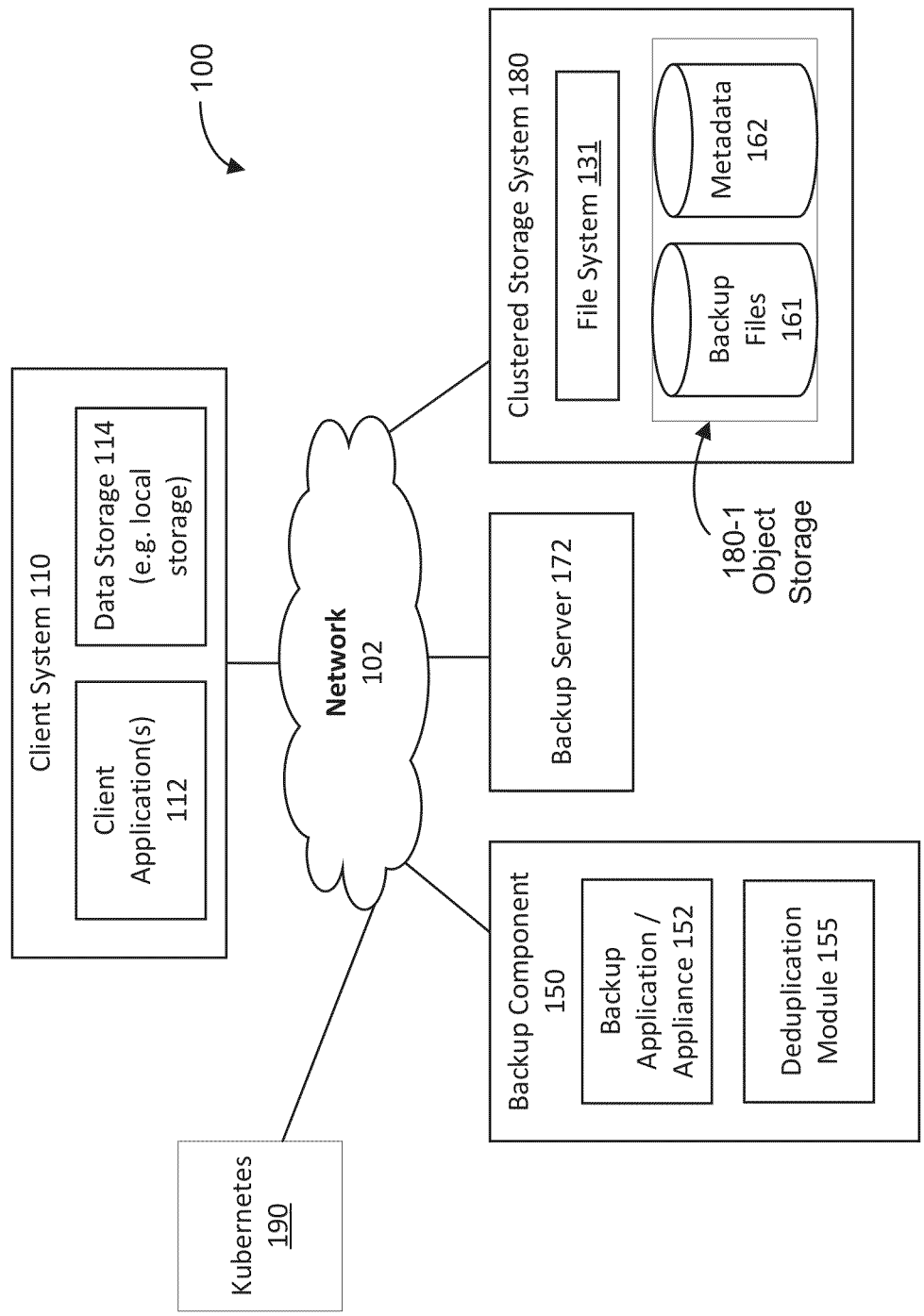
FIG. 1A is a block diagram illustrating an example operating environment according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method and computer program product) for detecting corruption in a deduplicated object storage system accessible by one or more microservices while minimizing costly read operations on objects. A similarity group verification path is selected when a total memory size of all the slice recipe names in a data domain is larger than the total memory size taken up by all the similarity groups in the same data domain.

A verify controller and plurality of worker nodes (i.e. virtual machines) work in concert to apply the similarity group verification path with respect to a microservice(s) and a deduplicated object storage system ("object storage"). The similarity group verification path is performed by a controller module and one or more worker nodes. The similarity group verification path includes controller phases and worker phases. The controller phases are: "list_sgs", "verify_sg_path," "get_corrupted_objects" and "verify_controller_complete." The worker phases, for each worker node, are: "record_sgs," "verify_sr_to_sg," "send_corrupted_objects" and "verify_worker_complete."

According to various embodiments, the controller module initiates the verify_sg_path phase to retrieve an object recipe from object storage and generates at least one slice recipe name based on object recipe metadata in accordance with a slice recipe name format. During the verify_sg_path phase, the controller module verifies that the object recipe metadata used to generate a respective local slice recipe name is accurate based on the respective local slice recipe name matching any corresponding slice recipe name in the object storage. However, if respective local slice recipe name fails to match a corresponding slice recipe name in the object storage, then the failure to find a match represents an existence of a corruption of the object metadata used to generate that respective local slice recipe name. The controller module sends each verified slice recipe name for the verify_sr_to_sg phase executed at a given worker node from a plurality of worker nodes. Upon receipt of respective verify_sr_to_sg complete messages from each of the plurality of worker nodes, the controller module initiates the get_corrupted_object phase to collect one or more corruptions identified by the controller module and one or more corruptions identified by the plurality of worker nodes.

According to various embodiments, a worker node(s) initiates the record_sgsphase to verify existence of corruption by determining whether a first fingerprint and corresponding segment size array ("first fingerprint array") in metadata of a similarity group is consistent with a compression region name in the metadata of the similarity group, where the similarity group was previously loaded into memory of the worker node. The worker node(s) initiates the verify_sr_to_sg phase to verify existence of corruption by determining whether a second fingerprint and corresponding segment size array ("second fingerprint array") in metadata of a slice recipe is consistent with the first fingerprint array. During various worker phases, the worker node(s) tracks instances of corruption to be sent to the controller module.

In addition, the system provides many benefits in contrast with the limitations of conventional system. The system allows for verifying that all objects in object storage are valid and for confirming whether relationships between objects are still valid. Such relationships include: "object-to-slice recipe," "slice recipe-to-similarity group" and "similarity group-to-compression region."

In some embodiments, such a system may be provided within an operating environment. An example of such an operating environment is further described herein with reference to FIG. 1A. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

Exemplary Environments

More specifically, and with reference to FIG. 1A, shown is a block diagram illustrating an example of an operating environment 100 for distributing phases of deduplication processing within a clustered storage environment according to one or more embodiments of the disclosure. As shown, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain Restorer (DDR)-based deduplication storage system, and backup server 172 may be implemented in conjunction with a Data Domain deduplication storage server provided by Dell EMC for use with DDR storage devices. For example, the backup server 172 may be a stand-alone entity, or can be an element of the clustered storage system 180. In some embodiments, the backup server 172 may be a Dell EMC Avamar server or a Dell EMC Networker server, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell EMC CloudBoost appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. However, as further described herein, in some embodiments, data deduplication may be performed entirely within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 (or backup objects) within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data. The clustered storage system 180 may be an object storage system that includes object storage 180-1 (as further described herein).

Figure 1B:
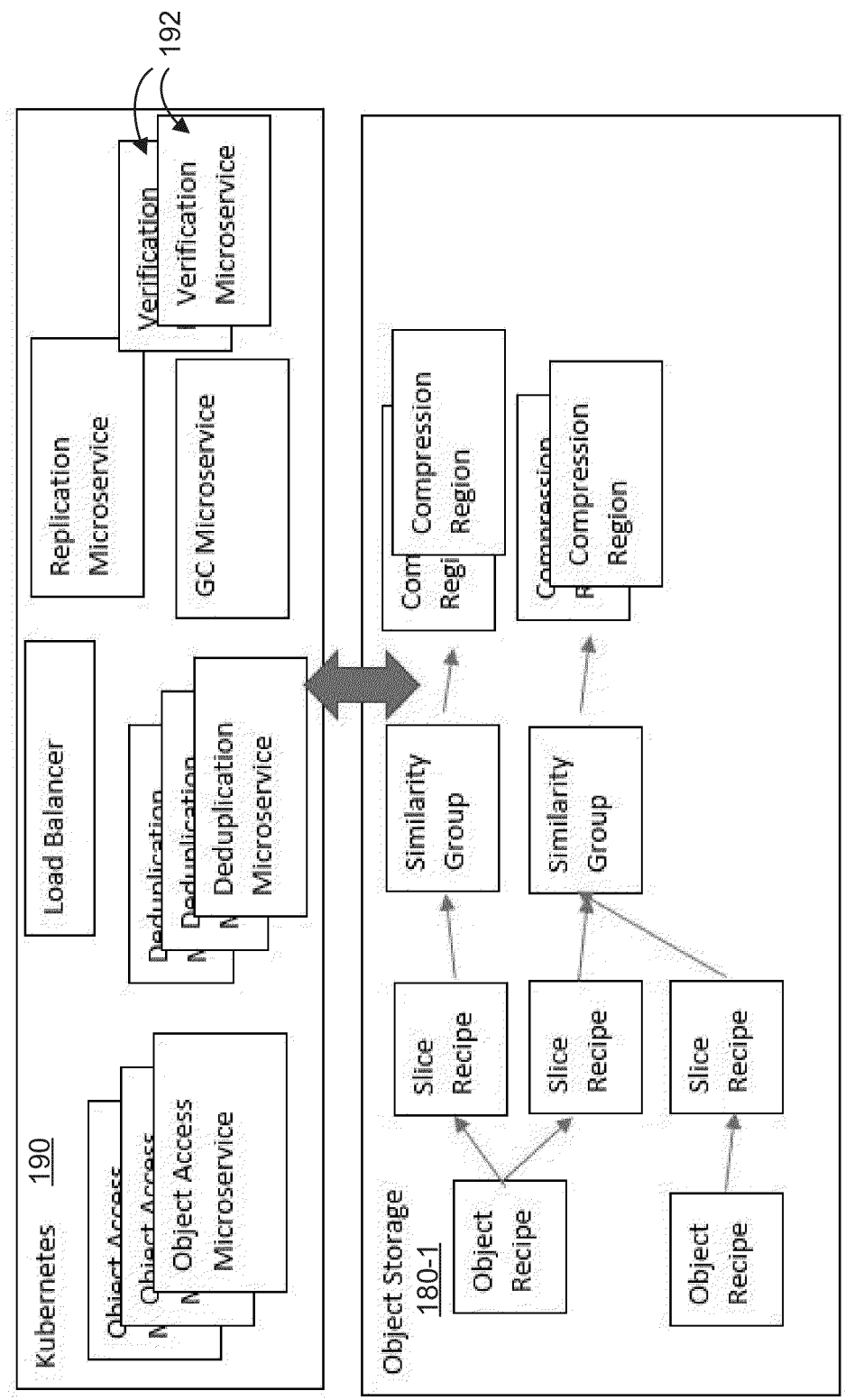
FIG. 1B is a block diagram illustrating an example operating environment according to one or more embodiments of the disclosure.
Figure 1C:
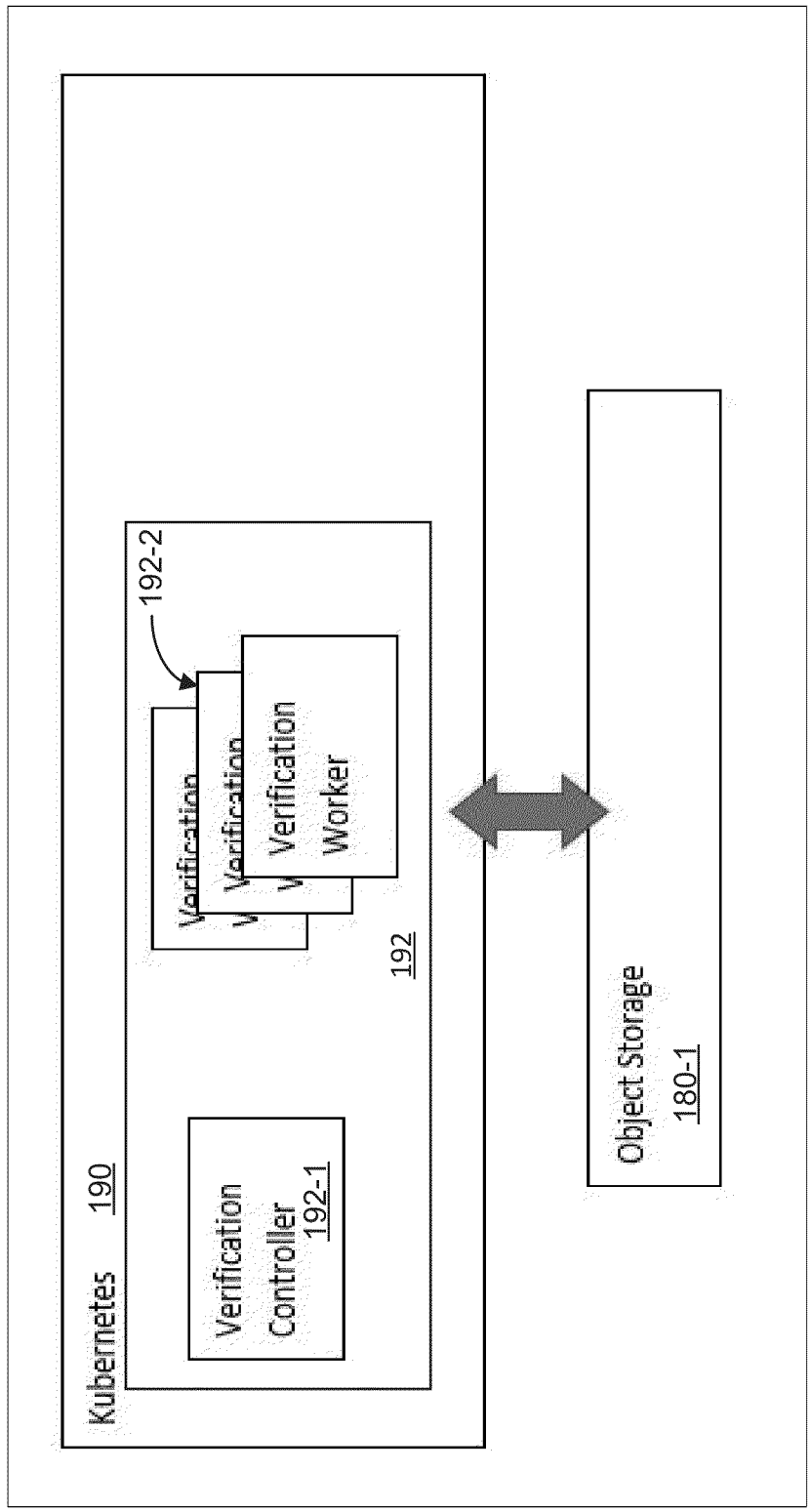
FIG. 1C is a block diagram illustrating an example operating environment according to one or more embodiments of the disclosure.

As shown in FIG. 1B, a cloud-based system platform 190 (such as, for example, a Kubernetes cloud computing environment) may provide for the deployment of various types of microservices. The platform 190 may allow for the deployment of a plurality of verification services 192 for determining whether relationships between objects in object storage 180-1 are still valid. As shown in FIG. 1C, various types of verification microservices 192 may be a verification controller 192-1 ("controller module") and a verification worker(s) 192-2 ("worker node(s)").

Figure 1D:
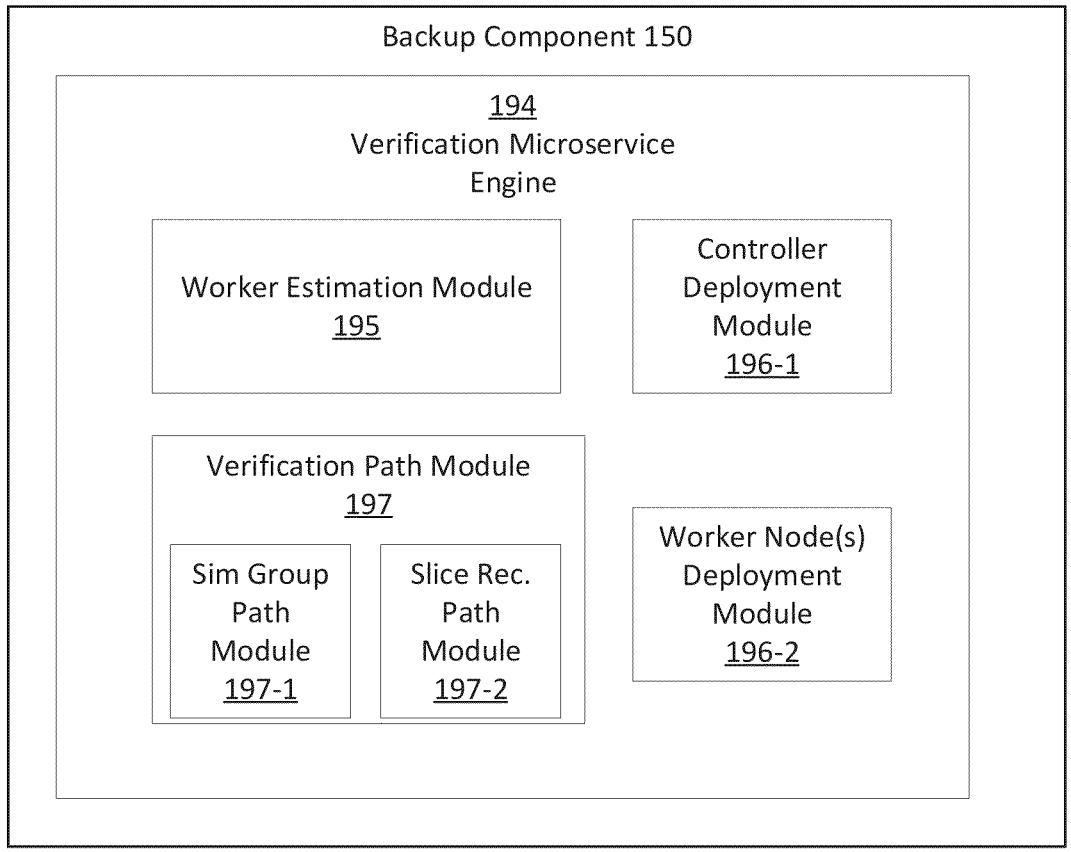
FIG. 1D is a block diagram illustrating an example operating environment according to one or more embodiments of the disclosure.

As shown in FIG. 1D, the verification microservice engine 194 may be included within the backup component 150. The verification microservice engine 194 includes a worker estimation module 195 that estimates an optimal amount of worker nodes to be instantiated. A verification path module 197 includes a similarity group path module 197-1 to execute the similarity group verification path based on detection of a similarity group verification path condition. The verification path module 197 also includes a slice recipe path module 197-2 to execute the slice recipe verification path. The slice recipe verification path is executed based on detection of a slice recipe verification path condition. A controller deployment module 196-1 instantiates a controller module 192-1 to perform controller module functionalities. The controller deployment module 196-1 also deploys the controller module 192-1 to the platform 190. A worker deployment module 196-2 instantiates one or more worker nodes 192-2 to perform worker node functionalities. The worker deployment module 196-2 also deploys the one or more worker nodes 192-2 to the platform 190.

Object Recipes, Slice Recipes, Similarity Groups & Compression Regions

Figure 2:
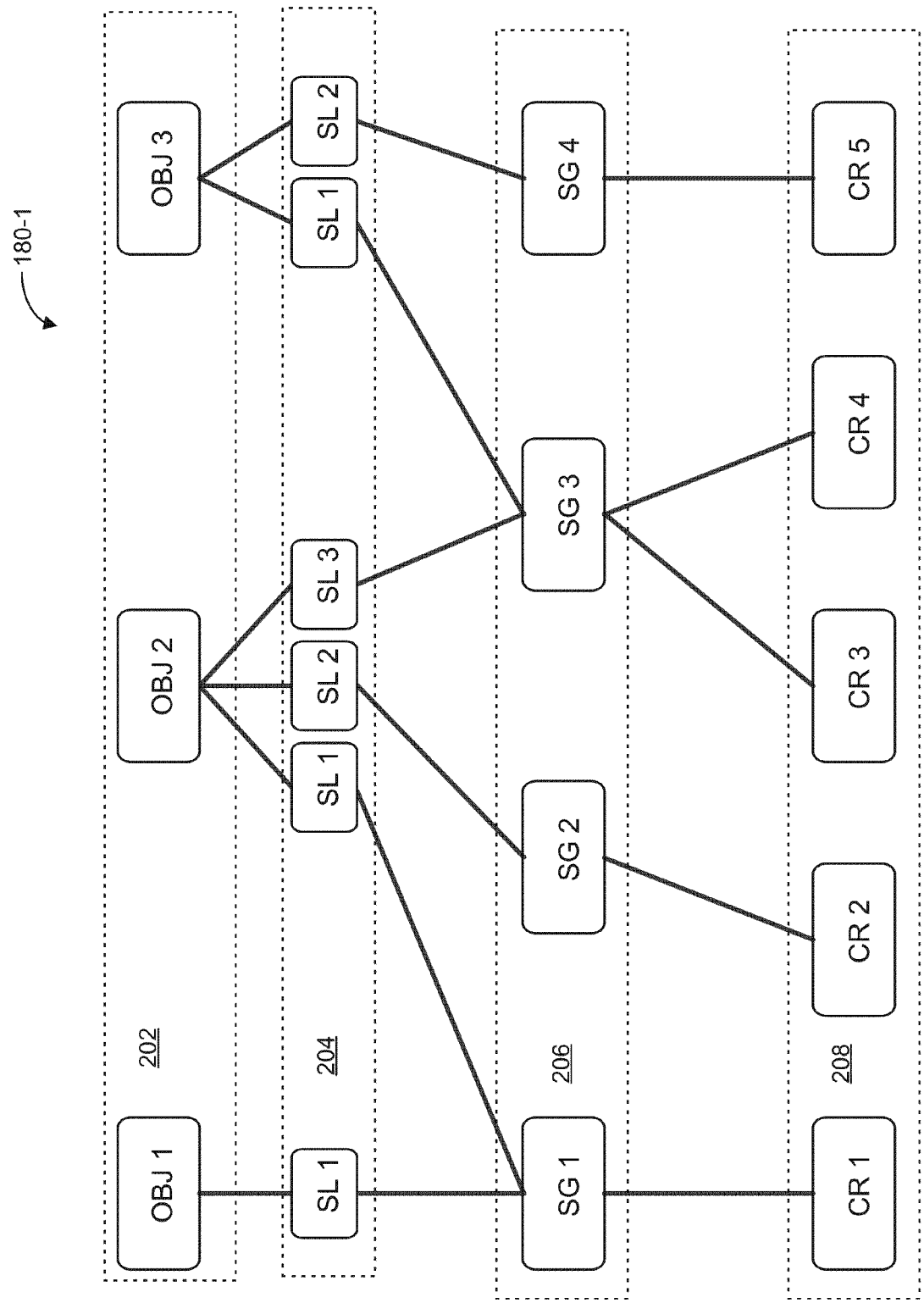
FIG. 2 is a block diagram illustrating relationships between object recipes, slice recipes, similarity groups and compression regions according to one or more embodiments of the disclosure.

As shown in FIG. 2, a portion of object storage 180-1 may include a plurality of object recipes 202 (obj1, obj2, obj3), a plurality of slice recipes 204 (sl1, sl2, sl3), a plurality of similarity groups 206 (sg1, sg2, sg3, sg4) and a plurality of compressions regions 208 (cr1, cr2, cr3, cr4, cr5). In various embodiments, when a customer's object is written to a microservice via a client, the object is split or divided into one or more parts — or sets of segments. A fingerprint is computed for each segment from the object. In other words, an object part may have multiple segments and a fingerprint is computed for each segment of the object part. Thus, each fingerprint maps to a segment of an object part. Lists of fingerprints are organized into slice recipes. Specifically, a slice recipe may include an array of fingerprints and sizes of segments that correspond to each respective fingerprint in the array. A sketch may then be computed for each slice recipe according to one or more sketch algorithms.

Slice recipes may then be organized into similarity groups. Specifically, a similarity group may include one or more slice recipes that have the same computed sketch. Stated differently, slice recipes are similar to each other if they have the same sketch. An object recipe, then, forms a one-to-one mapping to customer objects and references the one or more slice recipes associated with the object, since the associated slice recipes are based on an array of fingerprints of the object's segment(s). The actual segments that are unique according to the deduplication service may be stored in in a compressed format in the compression regions.

Each object has a corresponding object recipe. The object recipe may be identified based on the name given to an object by the customer or user or by an object recipe naming convention that references the corresponding object and the object's data domain. In a specific embodiment, a name of the object recipe is generated by obtaining a name of an object (as provided by the user) and concatenating, augmenting, or tagging the object name with additional metadata or tags to form the name of the object recipe.

Data Structures, Metadata & Naming Conventions

Figure 3:
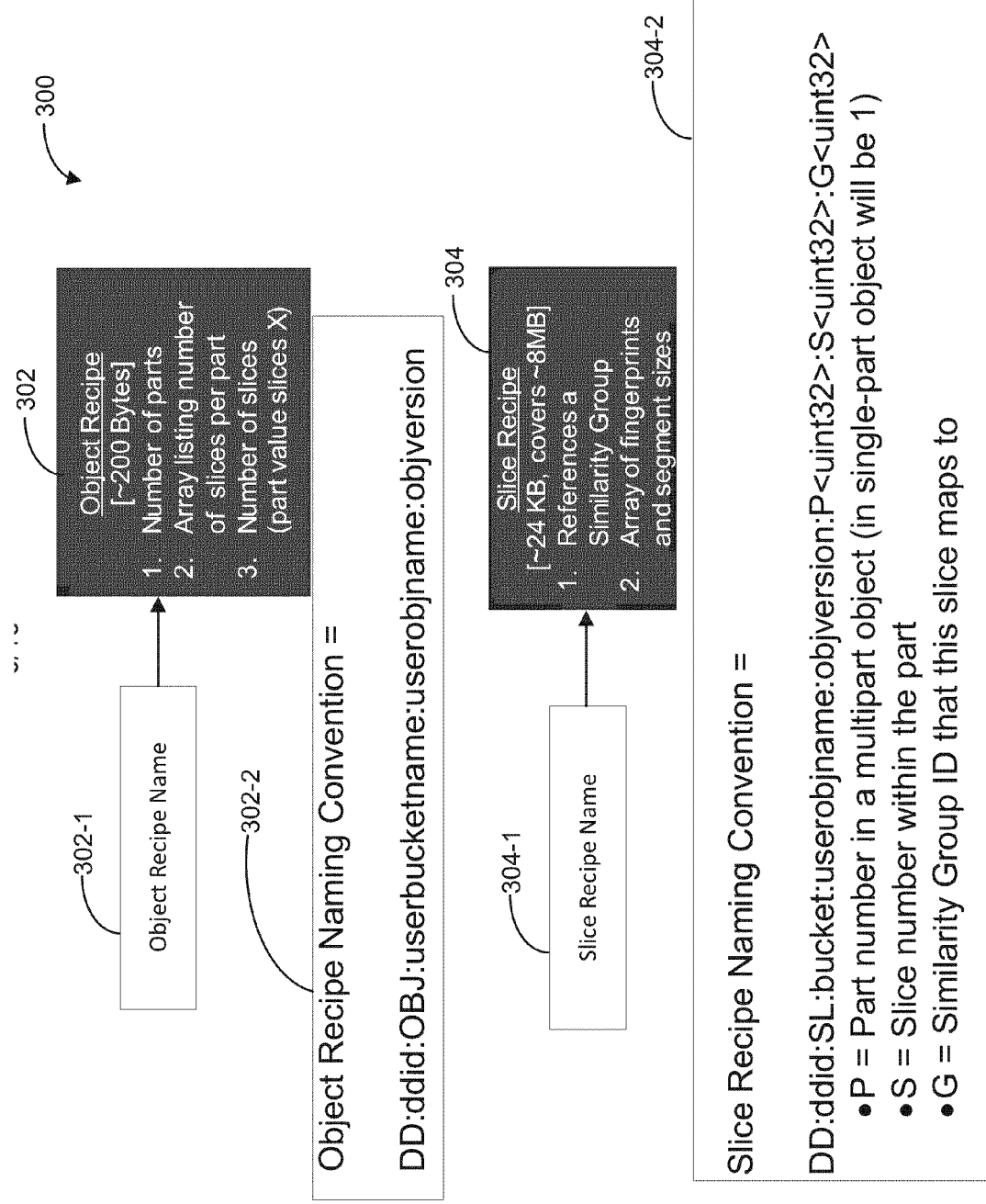
FIG. 3 is a block diagram illustrating naming conventions according to one or more embodiments of the disclosure.

As shown in FIG. 3, a diagram 300 illustrates an object recipe data structure 302 and a slice recipe data structure 304. The object recipe data structure 302 has metadata that indicates the number of parts of an object's data and an array stores metadata indicating how many slices of object data make up each individual object data part. Each slice may include one or more segments of object data, such as 8 KB of data. The slice recipe data structure 304 metadata further includes an internal reference variable indicating, for each object part indexed in the array, how many total slices correspond to that object part index.

Each object recipe has an object recipe name 302-1 that is a string in an object naming convention 302-2 (or object name format). The object naming convention 302-2 includes the object's data domain ("DD"), the data domain identifier ("ddid"), the object identifier("OBJ"), customer data ("userbucketname," "userobjname") and an object version number ("objversion"). According to various embodiments, a data domain may represent a product line or be a pre-assigned unique prefix.

The slice recipe data structure 304 includes metadata that includes a reference to a similarity group and a fingerprint array. The reference to the similarity group indicates a "slice recipe-to-similarity group" relationship. As described above, fingerprints are computed for each data segment from an object. The fingerprint array, then, includes an array of the fingerprints for those fingerprints included in a slice and the fingerprint further includes the sizes of each segment represented by a fingerprint. The slice recipe also identifies the object data part to which the particular slice belongs.

Each slice recipe has a slice recipe name 304-1 that is a string in a slice recipe naming convention 304-2 (or slice recipe name format). The slice recipe naming convention 302-2 includes the slice recipe's data domain ("DD"), the data domain identifier ("ddid"), a slice recipe identifier ("SL"), customer data ("userobjname"), the version number ("objversion") as was well indicating the object part ("P<...>"), an indication of which slice (from the slices for the object part) the slice recipe pertains ("S<...>") and a similarity group identifier ("G<...>") for the similarity group referenced in the slice recipe data structure 304.

Figure 4:
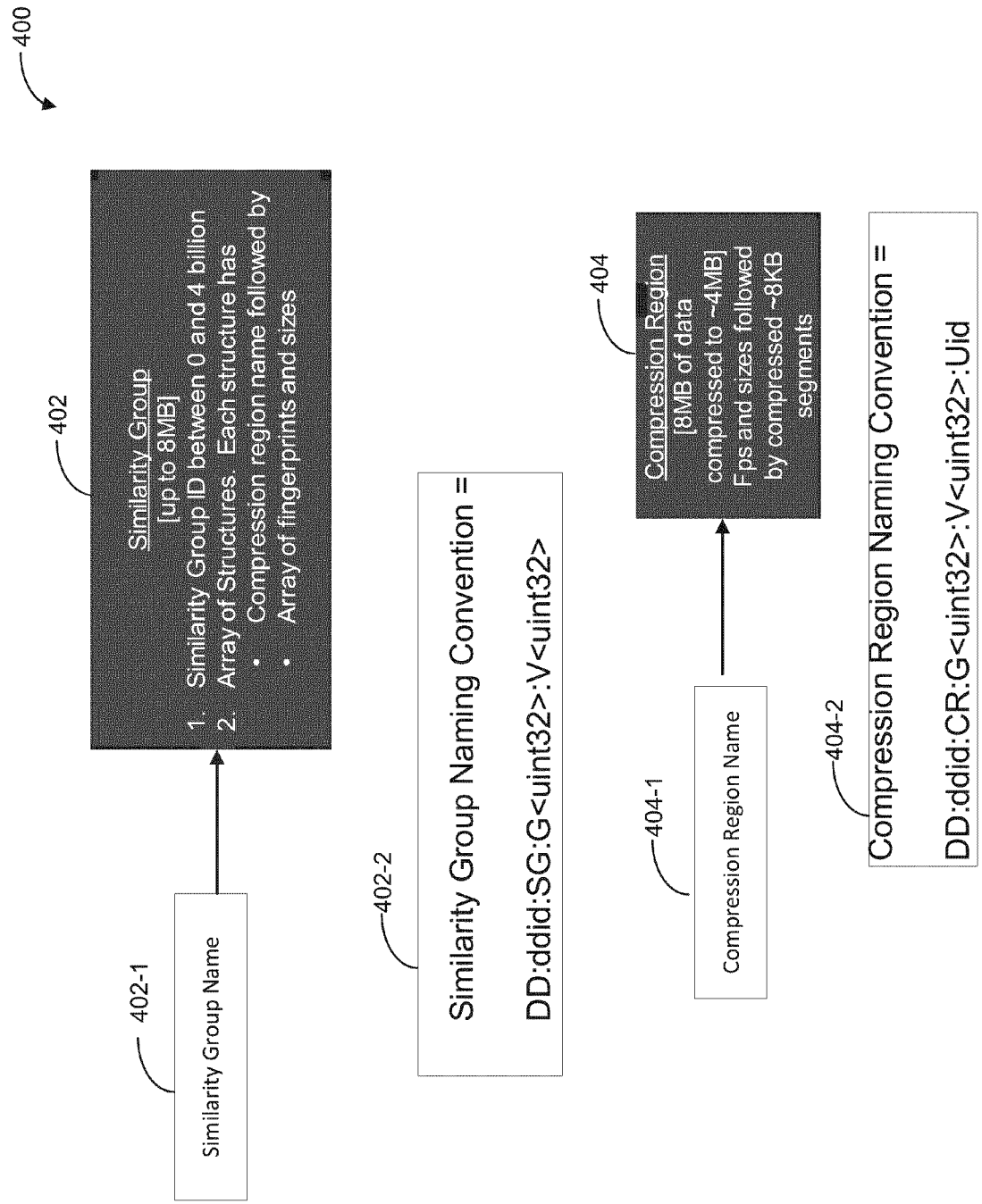
FIG. 4 is a block diagram illustrating naming conventions according to one or more embodiments of the disclosure.

As shown in FIG. 4, a diagram 400 illustrates a similarity group data structure 402 and a compression region data structure 404. The similarity group data structure 402 has metadata that includes a unique similarity group identifier. While a similarity group may reference multiple compression regions, each compression region itself is only referenced by a single similarity group. The similarity group data structure 402 metadata also includes an array of structures. Each structure includes a name of an underlying compression region name followed by a fingerprint array and corresponding segment sizes. Actual data segments (i.e. those data segments included in respective slices and represented by a specific fingerprint) that have been determined to be unique may be stored in a compressed format in a compression region, which is uniquely identified by its own compression region name - which is included in the similarity group data structure 402 metadata also includes an array of structures. Each compression region name in the metadata thereby indicates a "similarity group-to-compression region" relationship.

Each similarity group has a similarity group name 402-1 that is a string in a similarity group naming convention 402-2 (or similarity group name format). The similarity group naming convention 402-2 includes the similarity group's data domain ("DD"), which is a predetermined prefix string, the data domain identifier ("ddid"), a similarity group identifier ("SG") which indicates the object being identified is a similarity group and that similarity group's actual identifier ("G").

The compression region data structure 404 includes compressed unique data segments and the compressed data segment's correspond fingerprint and segment size. Each compression region has a compression region name 404-1 that is a string in a compression region naming convention 404-2 (or compression region name format). The compression region naming convention 404-2 includes the compression region's data domain ("DD"), the data domain identifier ("ddid"), a compression region identifier ("CR"), and user identifier ("Uid"). According to various embodiments, the "Uid" may be a hash value calculated over a fingerprint and segment size array which is used for a compression region name.

Similarity Group Verification Path

Figure 5:
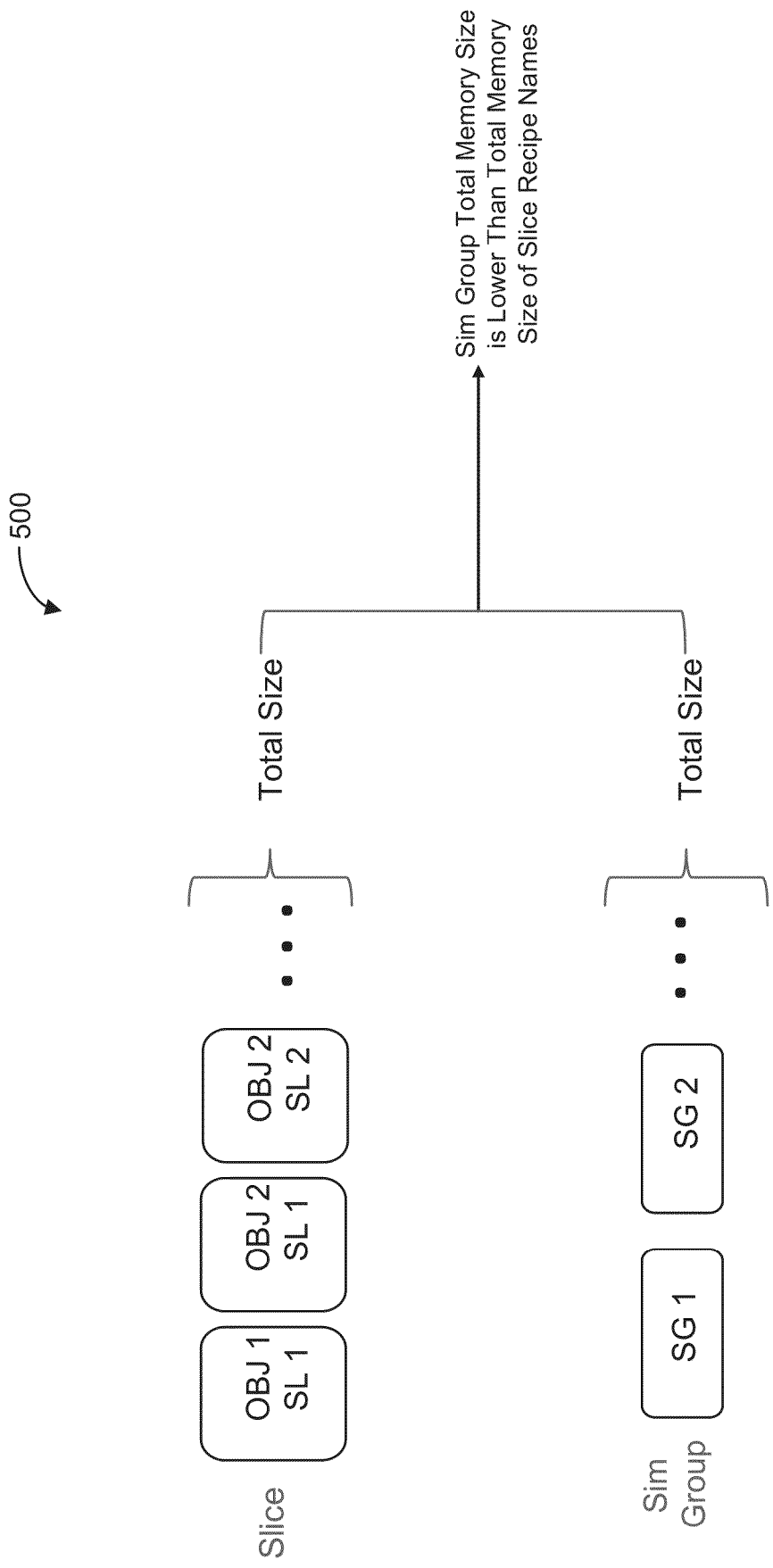
FIG. 5 is a block diagram illustrating a verification path condition according to one or more embodiments of the disclosure.

As shown in FIG. 5, a diagram 500 illustrates that a controller module 192-1 determines whether to perform the similarity group verification path based on detection of a particular condition. According to various embodiments, the similarity group verification path will be executed if one of the two following cases occur: the total memory size in object storage 180-1 of all similarity groups in a data domain is lower than a total memory size of all slice recipe names in the same data domain. In other embodiments, similarity group verification path may be forced (or triggered) via the values of one or more environment variables.

In various embodiments, during execution of the similarity group verification path, the controller module 192-1 communicates with worker nodes and the worker nodes communicate with the controller via RPC calls. For each similarity group verification path phase, the controller module 192-1 waits for all worker nodes to send a "finished" call before alerting the worker nodes to initiate a subsequent phase. Additionally, the controller module 192-1 and all worker nodes have a status check thread which runs according to a pre-defined interval. In the controller module 192-1, the status check thread attempts a simple RPC call to each worker node 192-2 to confirm its running state. In each worker node 192-2, the status check thread attempts a simple RPC call to the controller to confirm its running state as well. If any status check fails, the respective calling entity (controller module 192-1 or worker node 192-2) is responsible for stopping the similarity group verification path and reporting the error.

Figure 6:
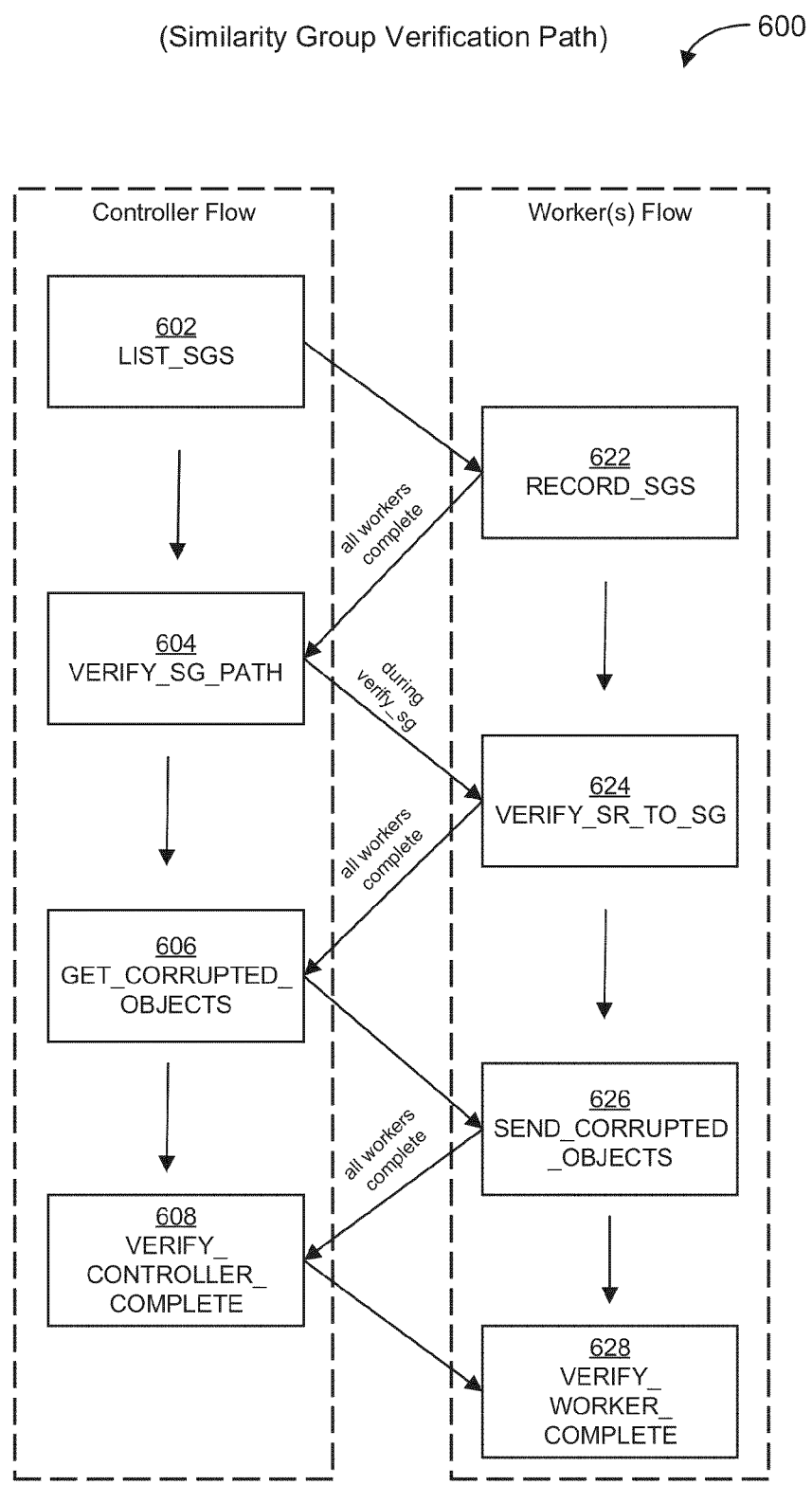
FIG. 6 is a block diagram illustrating phases of the verification path according to one or more embodiments of the disclosure.

As shown in FIG. 6, a diagram 600 illustrates a relationship between a controller workflow and a worker node workflow in the similarity group verification path phase. The controller workflow includes various phases, such as: "list_sgs 602," "verify_sg_path 604" "get_corrupted_objects 606" and "verify_controller_complete 608." The worker node workflow, for each worker node 192-2, includes various phases, such as "record_sgs 622," "verify_sr_to_sg 624," "send_corrupted_objects 626," and "verify_worker_complete 628."

The list_sgs phase 602 precedes the record_sgs phase 622. Once all worker nodes complete the record_sgs phase 622, the controller module 192-1 will initiate the verify_sg_path phase 604, which includes calls to one or more worker nodes to initiate a verify_sr_to_sg phase 624. Once all worker nodes complete the verify_sr_to_sg phase 624, the controller module 192-1 will initiate the get_corrupted_objects phase 606 — which includes calls to the one or more worker nodes to initiate the send_corrupted_objects phase 626. Once all worker nodes complete the send_corrupted_objects phase 626, the controller module 192-1 will verify completion (verify_controller_complete phase 608) — which includes calls to the one or more worker nodes to verify completion (verify_worker_complete phase 628).

Controller Module Phases

Figure 7A:
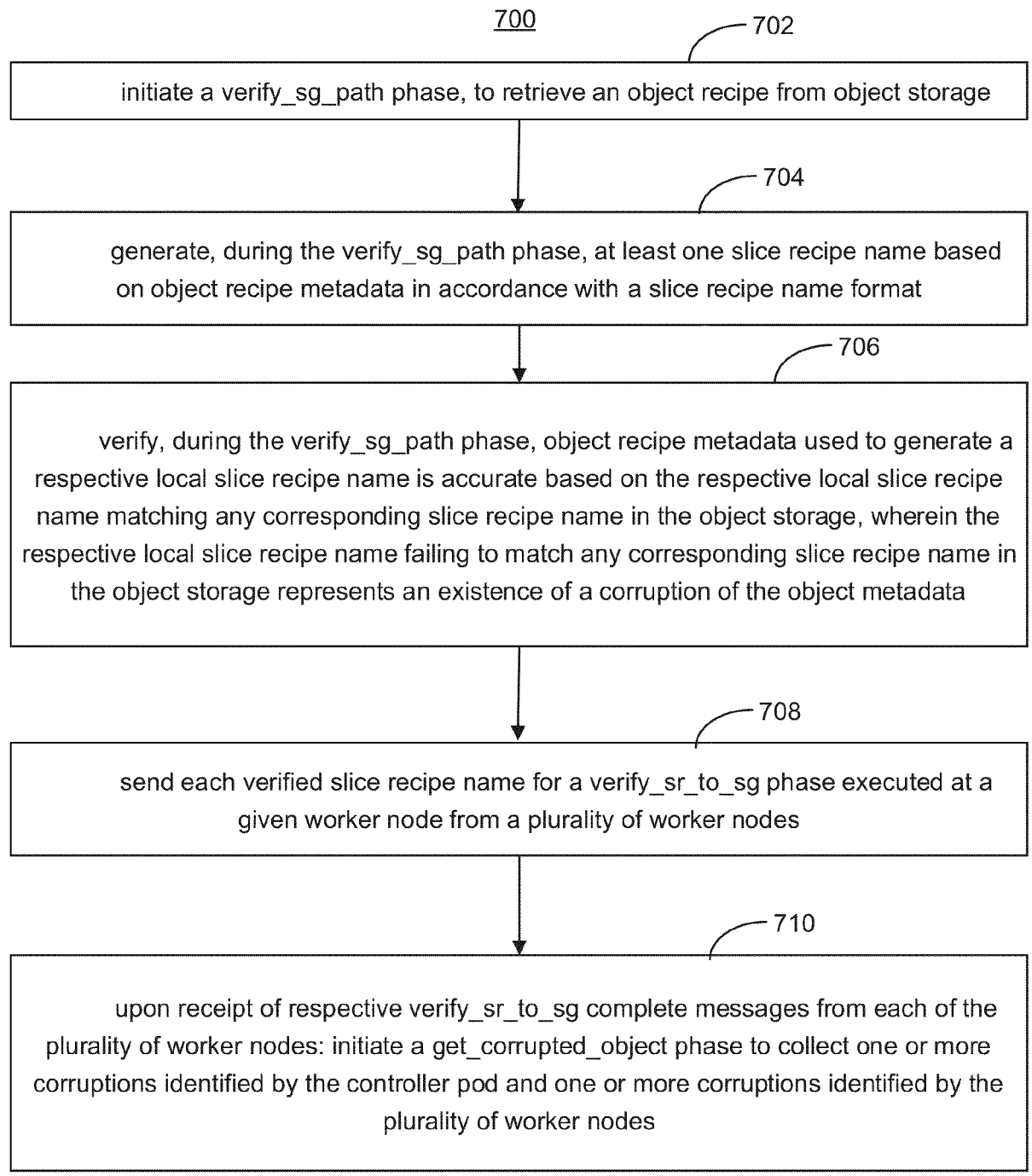
FIG. 7A is a flow diagram illustrating an example method according to one or more embodiments of the disclosure.

Prior to step 702 in the example method 700 as shown in FIG. 7A, the controller module 192-1 initiates a list_sgs phase 602. The objective of the list_sgs phase 602 is to identify similarity groups that need to be verified and to pass the identified similarity group to an appropriate worker node 192-2. The list_sgs phase 602 begins by the controller module 192-1 launching the check status thread. Next, the controller creates a worker ip channel map with keys corresponding to each worker pod's IP address and values corresponding to a channel of similarity group identifiers and data domain identifiers. The controller module 192-1 notifies each worker pod to start the record_sgs phase 622. The controller module 192-1 begins to fill up each worker ip channel map from which each worker node 192-2 will concurrently pull from.

To fill each respective worker ip channel map, the controller module 192-1 searches through all available data domain identifiers. For each data domain identifier, the controller lists the object attributes for all corresponding similarity groups in the data domain.

If the object timestamp of a similarity group falls within the range, or if timestamp checking is disabled, the controller module 192-1 identifies a worker node 192-2 that has been pre-assigned to that similarity group ("pre-assigned worker node"). The controller module 192-1 provides an identification of that similarity group to the pre-assigned worker node's worker ip channel map. Once all timestamps of similarity groups across all data domains have been checked and worker ip channel maps have been filled, the controller module 192-1 waits to receive a message from each worker node 192-2 that a record_sgs phase 622 has been completed at the worker node 192-2 before the controller module 192-1 initiates the verify_sg_path phase 604.

As shown in FIG. 7A, the controller module 192-1 initiates the verify_sg_path phase 604 to retrieve an object recipe from object storage 180-1 (step 702).

The objective of the verify_sg_path phase 604 is to perform verification on the object-to-slice recipe level and the slice recipe-to-similarity group level. The verify_sg_path phase 604 begins by the controller module 192-1 creating an internal map initialized with a key for every worker node 192-2 pointing to an empty channel of object attributes. Once the map is created, the controller module 192-1 makes an RPC call to each worker node 192-2 to trigger each respective worker node 192-2 to initiate the verify_sr_to_sg phase 624.

Next, the controller module 192-1 creates a new object channel of strings and triggers threads to verify object-to-slice recipe level relationships. The control module begins by looping through all data domain identifiers and lists all object recipes that exist for each data domain identifier. For every object recipe found, the controller module 192-1 places the object recipe identifier into the object channel mentioned above. If timestamp checking is enabled, and the object timestamp of the object recipe is not within timestamp range, the object recipe is skipped and a skipped counter is incremented.

At step 704, the controller module 192-1 generates, during verify_sg_path phase 604, at least one slice recipe name based on object recipe metadata in accordance with a slice recipe name format.

For example, while the controller module 192-1 is filling the object channel, each previously launched thread loop through the object channel process an object recipe already in the object channel. To process an object recipe, the controller module 192-1 retrieves the object recipe from object storage 180-1. If there is an error retrieving the object recipe, the controller module 192-1 indicates that error from the failed retrieval of the object recipe as an existence of a corruption with respect to the object recipe. If no error occurs, the object recipe is decoded and one or more slice recipes are recreated based on the metadata provided by the object recipe.

Since a slice recipe name format includes the object part number ("P<...>"), and a slice's number within the part ("S<...>"), the controller module 192-1 can cycle through the object recipe's metadata that indicates a total number of parts for the object and the array that lists how many slices correspond to data segments per object part. Stated differently, the controller module 192-1 accesses the object recipe metadata and recreates its own local version of a slice recipe name.

At step 706, the controller module 192-1 verifies, during the verify_sg_path phase 604, existence of corruption by determining whether each generated local slice recipe name does not match a corresponding slice recipe name in the object storage 180-1. That is, if the object recipe metadata is accurate and has not been modified, then using the object recipe metadata to generate local slice recipe names according the slice recipe naming convention 304-2 will result in an accurate local slice recipe name that has a matching corresponding slice recipe name stored in object storage 180-1. Since the controller module 192-1 has recreated its own local version of one or more slice recipe names, the controller module 192-1 pulls slice recipe names from object storage 180-1 and compares the local list of slice recipe names and the actual slice recipe names that exist in object storage 180-1. If a slice recipe name pulled from object storage 180-1 does not have a corresponding matching local slice recipe name, the controller module 192-1 indicates an existence of a corruption with respect to the object metadata used for the local slice recipe name because at least a portion of the object recipe metadata used to generate the local slice recipe name is inaccurate.

At step 708, the controller module 192-1 sends each verified slice recipe name for the verify_sr_to_sg phase 624 to executed at a given worker node 192-2 from a plurality of worker nodes. For example, as the controller module 192-1 verifies slice recipe names during the verify_sg_path phase 604, the controller module 192-1 sends verified slice recipe names to respective worker nodes to verify a "slice recipe-to-similarity" group relationship via the verify_sr_to_sg_path phase 624. Since each slice recipe name includes a similarity group identifier ("G<...>"), the controller module 192-1 sends each slice recipe name to the worker node 192-2 that have been pre-assigned to the similarity group identified in the slice recipe name.

Upon receipt of respective verify_sr_to_sg complete messages from each of the worker nodes, the controller module 192-1 initiates the get_corrupted_object phase 608 to collect one or more corruptions identified by the controller module 192-1 and one or more corruptions identified by the plurality of worker nodes (step 710).

The get_corrupted_object phase 608 consolidates corruptions identified by the controller module 192-1 and every worker node 192-2. The get_corrupted_object phase 608 begins by the controller module 192-1 sending an RPC request to each worker node 192-2 requesting initiation of the send_corrupted_objects phase 626. The controller module 192-1 receives, from each worker node 192-2, one or more corruptions identified during a worker node 192-2 phase 622, 624. The controller module 192-1 includes each worker node corruption into a corrupted object map that also includes those corruptions the controller module 192-1 identified.

The controller module 192-1 then prompts each worker node 192-2 to begin the verify_worker_complete phase 628 while the controller module 192-1 executes the verify_controller_complete phase 608. The verify_controller_complete phase 608 is responsible for printing out results and wrapping up verification. verify_controller_complete phase 608 begins by closing the worker status channel previous used to ensure all workers were in a running state. Next, the controller module 192-1 prints out relevant stats about verification along with any corrupt objects in the corrupted object map. The controller module 192-1 then closes a phase channel as there are no more phases left to complete. The controller module 192-1 also writes a starting timestamp of the current similarity group verification path run to configuration storage so that it can be referenced the next time another similarity group verification path is executed.

Worker Node(s) Phases

In example method 712, as shown in FIG. 7B, each worker node 192-2 initiates a record_sgs phase 622 to verify existence of corruption by determining whether a first fingerprint and corresponding segment size array in metadata of a similarity group is consistent with a compression region name in the metadata of the similarity group (step 714).

The objective of the record_sgs phase 622 is to have each worker node 192-2 receive all appropriate similarity groups that have been pre-assigned to the worker node 192-2 and identified by the controller module 192-1 during the list_sgs phase 602 and to verify the "similarity group-to-compression region" relationships. The worker node 192-2 retrieves each identified similarity group from object storage 180-1 and loads the retrieved similarity group into worker memory. If there is an error retrieving the similarity group from object storage 180-1, the worker node 192-2 will record the error as an existence of a corruption with respect to the failure to retrieve the similarity group.

Each similarity group has an array of structures. Each structure includes a compression region name associated with an array of fingerprints and segment sizes ("first fingerprint array"). Compression region names themselves are based on a hash ("Uid") of a corresponding fingerprint array. The worker node 192-2 calculates a temporary hash score for each fingerprint array and compares the temporary hash score to the fingerprint array's corresponding compression region name in the similarity group's metadata. If the temporary hash score does not match the compression region name from the similarity group's metadata, the worker node 192-2 will record an existence of a corruption with respect to the similarity group. Such an existence of a corruption indicates that some portion(s) of the fingerprint array in the similarity group used to calculate the temporary hash score is inaccurate because if the fingerprint was accurate than its corresponding temporary hash score would result in a compression region that can be found in the similarity group's metadata. Alternatively, the corruption indicates that the compression region name in the similarity group's metadata has become corrupted. The worker node 192-2 may also attempt to locate a compression region that is actually in object storage 180-1 based on the compression region name in the similarity group's metadata - as opposed to executing a costly read operation of a compression region in object storage 180-1. If no compression region is found, the worker node 192-2 will record an existence of a corruption with respect to the compression region. Such an existence of a corruption indicates the compression region cannot be located in object storage after a call for the corruption using a compression region name from the similarity group that has already be validated as accurate by a matching temporary hash score.

At step 716, each worker node 192-2 initiates a verify_sr_to_sg phase 624 to verify existence of corruption by determining whether a second fingerprint and corresponding segment size array in metadata of a slice recipe is consistent with the first fingerprint and corresponding segment size array in the metadata of the similarity group stored in the memory of the worker node 192-2. The objective of the verify_sr_to_sg phase 624 is to verify "slice recipe-to-similarity group" relationships. A worker node 192-2 will initiate the verify_sr_to_sg phase 624 based on receipt of a slice recipe name from the controller module 192-1 in the verify_sg_path phase 604. According to various embodiments, it is understood that a similarity group may have multiple, different fingerprint and corresponding segment size arrays ("fingerprint arrays") stored as metadata such that a fingerprint array of a respective slice recipe may be compared to each different fingerprint array in the similarity group's metadata to determine whether there has been a corruption detected on the basis of the slice recipe fingerprint array failing to match up with any of the similarity group's metadata fingerprint arrays. If the slice recipe fingerprint array matches up with one of the multiple fingerprint arrays stored in the similarity group's metadata, such a match indicates no corruption has occurred. Stated differently, if a particular fingerprint from a slice recipe array is not located in any of the multiple fingerprint arrays stored in the similarity group's metadata, then a corruption has been identified as to the relationship between the corresponding slice recipe and similarity group. Such a corruption may be that a slice recipe has become corrupted such that a fingerprint in the slice recipe has been modified.

The worker node 192-2 accesses object storage 180-1 and locates the slice recipe that corresponds to the received slice recipe name sent during the controller module 192-1 verify_sg_path phase 604. The worker node 192-2 loads the slice recipe into worker memory, which still includes one or more similarity groups from the record_sgs phase 622. The metadata of the retrieved slice recipe includes a reference to a corresponding similarity group. The worker node 192-2 accesses the entries of the fingerprint arrays in the metadata of the corresponding similarity group in worker memory to the entries in the fingerprint array in the metadata of the slice recipe recently loaded into worker memory. The worker node 192-2 compares the entries in the fingerprint arrays. If there are entries that do not match, the worker node 192-2 will record an existence of a corruption with respect to the slice recipe. Upon completion of the fingerprint array comparison, the worker node 192-2 releases the slice recipe from worker memory.

At step 718, each worker node 192-2 tracks instances of corruption to be sent to a controller module 192-1. As described above, each worker node 192-2 records various corruptions detected during the record_sgs phase 622 and the verify_sr_to_sg phase 624. In the send_corrupted_objects phase 626, each worker node 192-2 simply makes an RPC call to the controller module 192-1 with a list of corrupt objects detected during the record_sgs phase 622 and the verify_sr_to_sg phase 624. In the verify_worker_complete phase 628, the worker node 192-2 closes an of its active channels and prints out phase data to one or more logs and shuts down.

As noted, the operations (or steps) shown in the above in the methods 700, 712 are not necessarily performed in the order indicated and may be performed in parallel, as a single operation, or as multiple operations.

Worker Node "Record_Sgs" Phase

Figure 8:
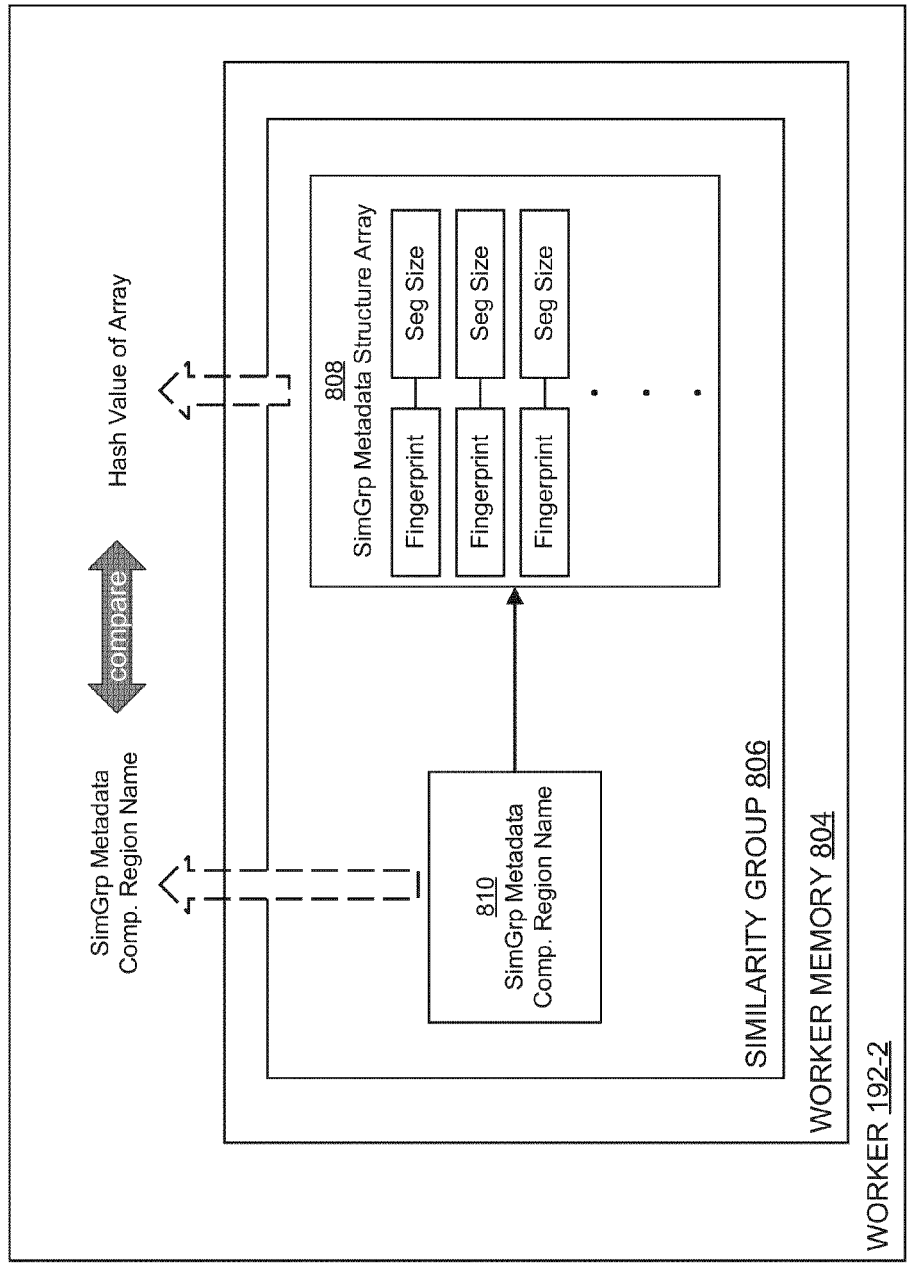
FIG. 8 is a block diagram illustrating a phase according to one or more embodiments of the disclosure.

In a diagram 800 as shown in FIG. 8, a worker node 192-2 executes the record_sgs phase 622 with respect to a similarity group 806 in worker memory 804. The similarity group 806 has a compression region name 810 and a fingerprint array 808 in its metadata. However, it is understood that the similarity group 806 may have metadata that includes multiple compression region names where each compression region name may be associated with a respective fingerprint array having one or more fingerprints and corresponding segment sizes. The worker node 192-2 calculates a temporary hash value based on the fingerprint array 808. The worker node compares the temporary hash value to the compression region name 810 associated with the fingerprint array 808. If the temporary hash value does not match the compression region name 810, the worker node 192-2 will record an existence of a corruption with respect to the similarity group 806. The worker node 192-2 may also attempt to locate a compression region that is actually in object storage 180-1 based on the compression region name 810 in the similarity group's metadata. If no compression region is found, the worker node 192-2 will record an existence of a corruption with respect to the compression region without the cost of reading one or more compression regions directly from object storage 180-1. By leveraging verification of the referential integrity as between a respective similarity group's compression region name metadata and the compression region itself, the verification path minimizes the compression regions that must be read for verification.

Controller Module "Verify_SG_Path" Phase

Figure 9:
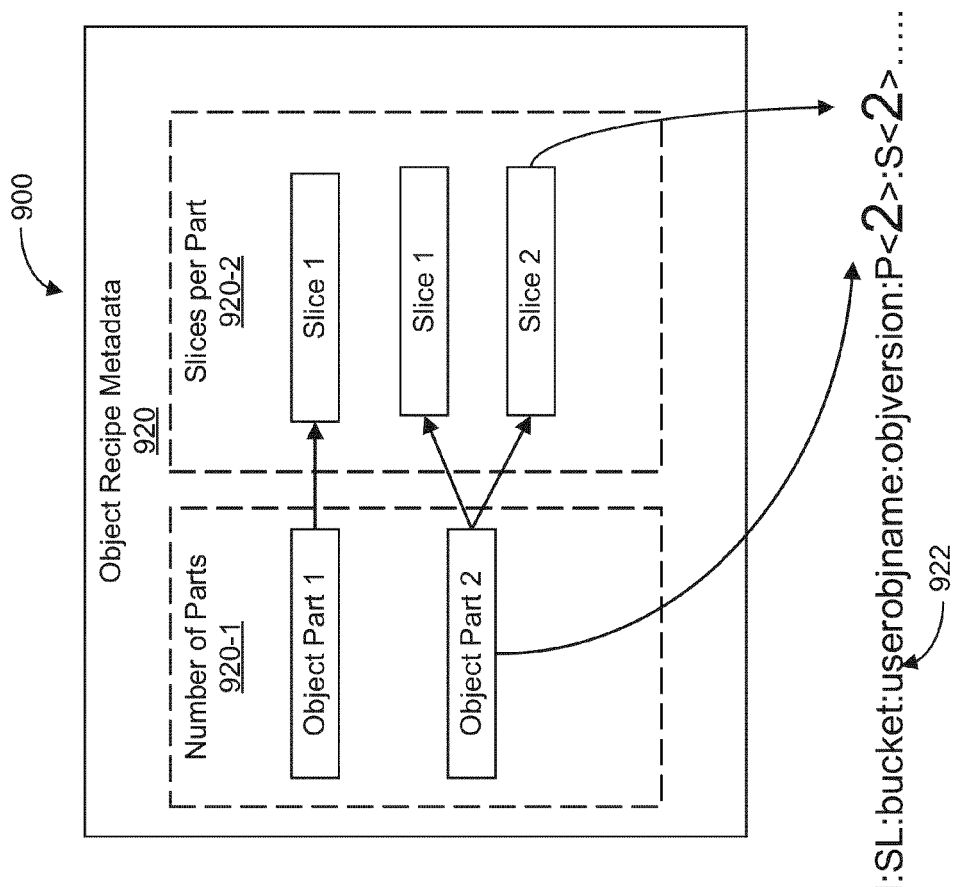
FIG. 9 is a block diagram illustrating a phase according to one or more embodiments of the disclosure.

In a diagram 900 as shown in FIG. 9, the controller module 192-1 recreates a slice recipe name 922 based on object recipe metadata 920. The object recipe metadata 920 includes a value representing an amount of object parts 920-1 and an array that provides a number of slices 920-2 that map to each object part. For example, the controller module 192-1 generates a string for the slice recipe name 922 according to the slice recipe naming convention 304-2 for the second slice of the second object part. According to various embodiments, each slice recipe name string is combined with a pre-generated value for the "G<...>" portion of the slice recipe naming convention 304-2 that is populated according to the similarity group referenced by the respective slice recipe.

Worker Node "Verify_SR_to_SG" Phase

Figure 10:
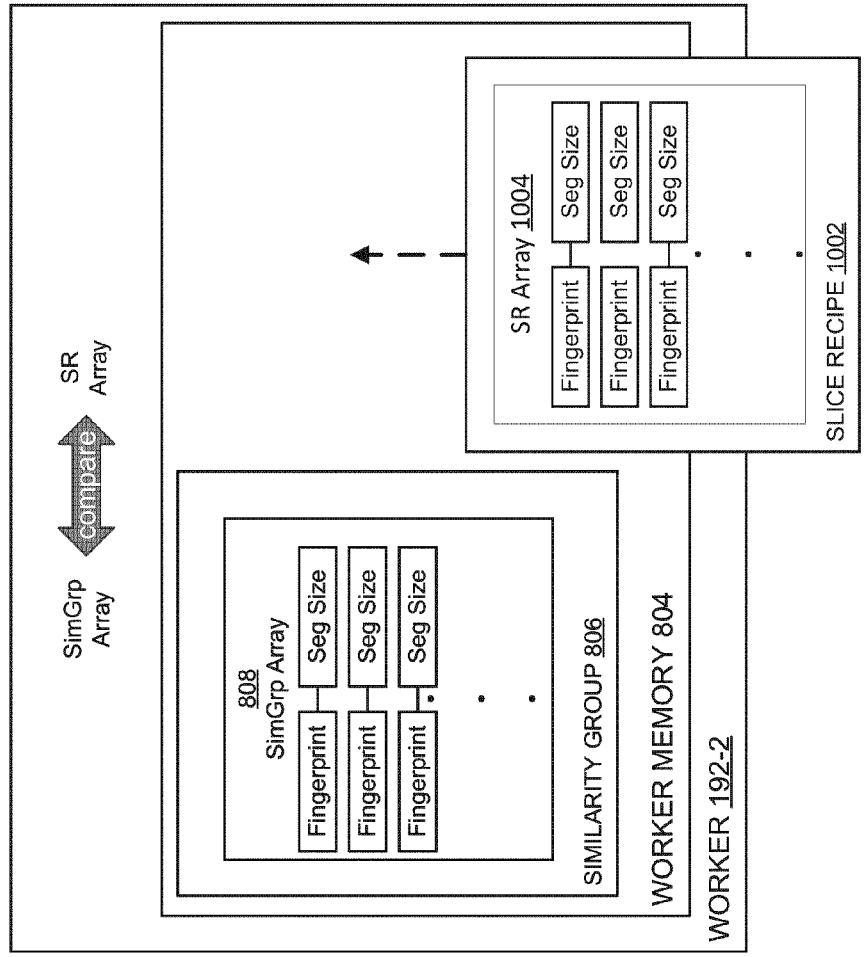
FIG. 10 is a block diagram illustrating a phase according to one or more embodiments of the disclosure.
Figure 10:
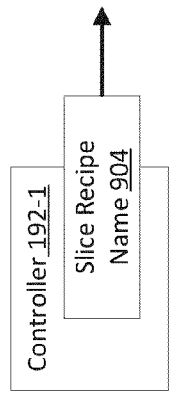

In a diagram 1000 as shown in FIG. 10, the worker node 192-2 executes the verify_sr_to_sg phase 624 with respect to a similarity group 806 in worker memory 804. The worker node accesses object storage 180-1 and locates the slice recipe 1002 that corresponds to the received slice recipe name 904 sent during the controller module 192-1's 192-1 verify_sg_path phase 604. The worker node 192-2 loads the slice recipe 1002 into worker memory 804. The worker node 192-2 accesses the entries of the fingerprint array 808 in the similarity group's 806 metadata and the entries in the fingerprint array 1004 in the slice recipe's 1002 metadata. The worker node 192-2 compares the entries in the fingerprint arrays 808, 1002. If there are entries that do not match, the worker node 192-2 will record an existence of a corruption with respect to the slice recipe 1002. Such a corruption may be that a slice recipe has become corrupted such that a fingerprint in the slice recipe has been modified. Upon completion of the fingerprint array comparison, the worker node 192-2 releases the slice recipe 1002 from worker memory 804.

Exemplary Computing System

Figure 11:
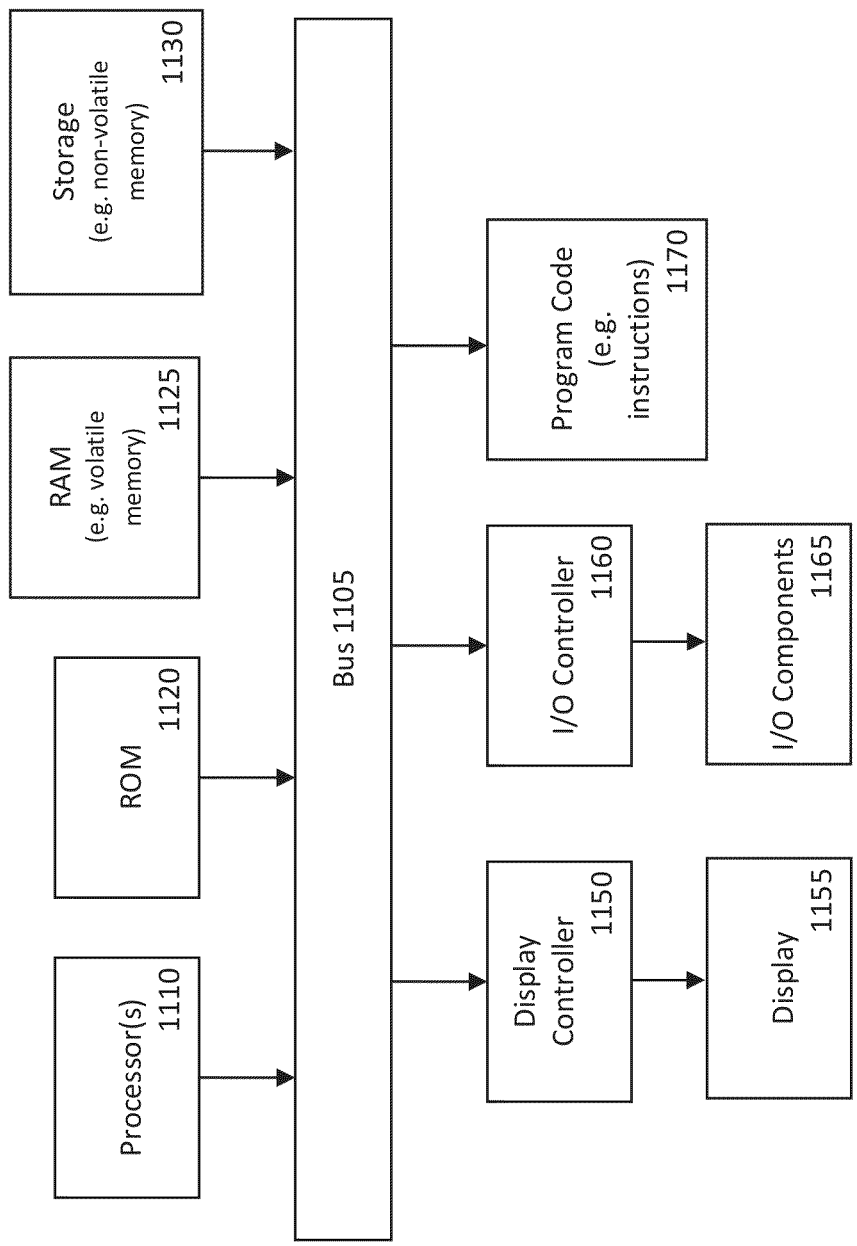
FIG. 11 is a block diagram illustrating an example of a computing system that may be used in conjunction with one or more embodiments of the disclosure.

FIG. 11 shows a block diagram of an example of a computing system that may be used in conjunction with one or more embodiments of the disclosure. For example, computing system 1100 (or system, or server, or computing device, or device) may represent any of the devices or systems described herein that perform any of the processes, operations, or methods of the disclosure. Note that while the computing system 1100 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1100 may include a bus 1105 which may be coupled to a processor 1110, ROM (Read Only Memory) 1120, RAM (or volatile memory) 1125, and storage (or non-volatile memory) 1130. The processor(s) 1110 may retrieve stored instructions from one or more of the memories 1120, 1125, and 1130 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 1110 may perform operations in an on-demand or "cloud computing" environment or as a service (e.g. within a "software as a service" (SaaS) implementation). Accordingly, the performance of operations may be distributed among the one or more processors 1110, whether residing only within a single machine or deployed across a number of machines. For example, the one or more processors 1110 may be located in a single geographic location (e.g. within a home environment, an office environment, or a server farm), or may be distributed across a number of geographic locations. The RAM 1125 may be implemented as, for example, dynamic RAM (DRAM), or other types of memory that require power continually in order to refresh or maintain the data in the memory. Storage 1130 may include, for example, magnetic, semiconductor, tape, optical, removable, non-removable, and other types of storage that maintain data even after power is removed from the system. It should be appreciated that storage 1130 may be remote from the system (e.g. accessible via a network).

A display controller 1150 may be coupled to the bus 1105 in order to receive display data to be displayed on a display device 1155, which can display any one of the user interface features or embodiments described herein and may be a local or a remote display device. The computing system 1100 may also include one or more input/output (I/O) components 1165 including mice, keyboards, touch screen, network interfaces, printers, speakers, and other devices. Typically, the input/output components 1165 are coupled to the system through an input/output controller 1160.

Program code 1170 may represent any of the instructions, applications, software, libraries, toolkits, modules, components, engines, units, functions, logic, etc. as described herein. Program code 1170 may reside, completely or at least partially, within the memories described herein (e.g. non-transitory computer-readable media), or within a processor during execution thereof by the computing system. Program code 1170 may include both machine code, such as produced by a compiler, and files containing higher-level or intermediate code that may be executed by a computing system or other data processing apparatus (or machine) using an interpreter. In addition, program code 1170 can be implemented as software, firmware, or functional circuitry within the computing system, or as combinations thereof. Program code 1170 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A computer-implemented method, comprising:
retrieving, by a controller module, an object recipe from an object storage;
generating, by the controller module, at least one slice recipe name based on object recipe metadata in accordance with a slice recipe name format;
verifying, by the controller module, object recipe metadata is accurate and has not been modified, based on the respective local slice recipe name that was generated from the object recipe metadata matching any corresponding slice recipe name in the object storage, wherein the respective local slice recipe name matching any corresponding slice recipe name in the object storage being a verified slice recipe name;
sending, by the controller module, each verified slice recipe name to a selected one of a plurality of worker nodes, each of verified slice recipe names being pre-assigned to the selected one of the plurality of worker nodes, the selected worker node being pre-assigned to a similarity group identified by a respective retrieved similarity group name each of the plurality of worker nodes verifying if there is corruption in the slice recipes corresponding to the verified slice recipe names based on slice recipe metadata;
receiving, by the controller module, a plurality of lists of one or more corruptions identified by each of the plurality of worker nodes, each of the plurality of lists being identified based on the verified slice recipe names sent by the controller module to each of the plurality of worker nodes;
receiving, by the controller module, notifications from each of the plurality of worker nodes that the identification of corruptions is complete for the verified slice recipe names received by the worker nodes; and
collecting, by the controller module, one or more corruptions identified by the controller module and the plurality of lists of one or more corruptions identified by the plurality of worker nodes in response to receiving notification from all of the plurality of worker nodes that were sent verified slice recipe names that the verification of corruptions is complete.

2. The computer-implemented method of claim 1, wherein generating the at least one slice recipe further comprises:
retrieving, by the controller module, an object part identifier in the object recipe metadata;
retrieving, by the controller module, a slice number identifier in the object recipe metadata, the slice number identifier corresponding to the object part identifier; and
generating, by the controller module, a slice recipe name string that includes the retrieved object part identifier and the retrieved slice number identifier, the slice recipe name format having a pre-defined object part identifier string placement and a pre-defined slice number identifier string placement.

3. The computer-implemented method of claim 2, wherein verifying object recipe metadata used to generate a respective local slice recipe name is accurate further comprises:
retrieving, by the controller module, a list of slice recipe names from the object storage, the listed slice recipe names corresponding to a same object in a first data domain as the retrieved object recipe;
verifying, by the controller module, that each slice recipe name from object storage has a matching local slice recipe name generated from the object recipe; and
generating, by the controller module, a corruption identification upon detecting an inconsistency between a respective listed slice recipe name and a corresponding local slice recipe name generated from the object recipe.

4. The computer-implemented method of claim 1, further comprising:
retrieving, by the controller module, prior to retrieving an object recipe from object storage, a list of similarity group names that correspond to any object in the first data domain;
sending, by the controller module, the retrieved similarity group name to the select worker node.

5. The computer-implemented method of claim 4, further comprising:
selecting, by the controller module, prior to retrieving the list of similarity group names that correspond to any object in the first data domain, a similarity group verification path instead of a slice recipe verification path based on detecting a total amount of memory taken up by a plurality of similarity groups is less than a total amount of memory taken up by a plurality of slice recipe names.

6. The computer-implemented method of claim 4, wherein retrieving a list of similarity group names further comprises:
retrieving, by the controller module, one or more similarity group names, from object storage, that have a same data domain identifier, each similarity group name comprising a string in a similarity group name format, the similarity group name format having a data domain identifier string position.

7. The computer-implemented method of claim 1, further comprising:
sending, by the controller module, to each respective worker node, a corrupted objects request, the corrupted objects request requesting each corruption identified by the respective worker node; and
adding, by the controller module, each corruption identified by each worker node to a controller corrupted object map, the controller corrupted object map including each corruption identified by the controller module.

8. A system comprising:
one or more processors; and
a non-transitory computer readable medium storing a plurality of instructions, which when executed, cause the one or more processors to:
retrieve, by a controller module, an object recipe from an object storage;
generate, by the controller module, at least one slice recipe name based on object recipe metadata in accordance with a slice recipe name format;
verify, by the controller module, object recipe metadata is accurate and has not been modified, based on the respective local slice recipe name that was generated from the object recipe metadata matching any corresponding slice recipe name in the object storage, wherein the respective local slice recipe name matching any corresponding slice recipe name in the object storage being a verified slice recipe name;

send, by the controller module, each verified slice recipe name to a selected one of a plurality of worker nodes, each of verified slice recipe names being pre-assigned to the selected one of the plurality of worker nodes, the selected worker node being pre-assigned to a similarity group identified by a respective retrieved similarity group name each of the plurality of worker nodes verifying if there is corruption in the slice recipes corresponding to the verified slice recipe names based on slice recipe metadata;

receive, by the controller module, a plurality of lists of one or more corruptions identified by each of the plurality of worker nodes, each of the plurality of lists being identified based on the verified slice recipe names sent by the controller module to each of the plurality of worker nodes;

receiving, by the controller module, notifications from each of the plurality of worker nodes that the identification of corruptions is complete for the verified slice recipe names received by the worker nodes; and collect, by the controller module, one or more corruptions identified by the controller module and the plurality of lists of one or more corruptions identified by the plurality of worker nodes in response to receiving notification from all of the plurality of worker nodes that were sent verified slice recipe names that the verification of corruptions is complete.

9. The system of claim 8, wherein the instructions for generating the at least one slice recipe further cause the one or more processors to:

retrieve, by the controller module, an object part identifier in the object recipe metadata;

retrieve, by the controller module, a slice number identifier in the object recipe metadata, the slice number identifier corresponding to the object part identifier; and generate, by the controller module, a slice recipe name string that includes the retrieved object part identifier and the retrieved slice number identifier, the slice recipe name format having pre-defined object part identifier string placement and a pre-defined slice number identifier string placement.

10. The system of claim 9, wherein the instructions for verifying object recipe metadata used to generate a respective local slice recipe name is accurate further cause the one or more processors to:

retrieve, by the controller module, a list of slice recipe names from the object storage, the listed slice recipe names corresponding to a same object in a first data domain as the retrieved object recipe;

verify, by the controller module, that each slice recipe name from object storage has a matching local slice recipe name generated from the object recipe; and generate, by the controller module, a corruption identification upon detecting an inconsistency between a respective listed slice recipe name and a corresponding local slice recipe name generated from the object recipe.

11. The system of claim 8, wherein the instructions further cause the one or more processors to:

retrieve, by the controller module, prior to retrieving an object recipe from object storage, a list of similarity group names that correspond to any object in the first data domain; and send, by the controller module, the retrieved similarity group name to the select worker node.

12. The system of claim 11, wherein the instructions further cause the one or more processors to:

select, by the controller module, prior to retrieving the list of similarity group names that correspond to any object in the first data domain, a similarity group verification path instead of a slice recipe verification path based on detecting a total amount of memory taken up by a plurality of similarity groups is less than a total amount of memory taken up by a plurality of slice recipe names.

13. The system of claim 11, wherein the instructions for retrieving a list of similarity group names further cause the one more processors to:

retrieve, by the controller module, one or more similarity group names, from object storage, that have a same data domain identifier, each similarity group name comprising a string in a similarity group name format, the similarity group name format having a data domain identifier string position.

14. The system of claim 8, wherein the instructions further cause the one or more processors to:

send, by the controller module, to each respective worker node, a corrupted objects request, the corrupted objects request requesting each corruption identified by the respective worker node; and add, by the controller module, each corruption identified by each worker node to a controller corrupted object map, the controller corrupted object map including each corruption identified by the controller module.

15. A computer program product comprising a non-transitory computer-readable medium having a computer-readable program code embodied therein to be executed by one or more processors, the program code including instructions to:

retrieve, by a controller module, an object recipe from an object storage;

generate, by the controller module, at least one slice recipe name based on object recipe metadata in accordance with a slice recipe name format;

verify, by the controller module, object recipe metadata is accurate and has not been modified, based on the respective local slice recipe name that was generated from the object recipe metadata matching any corresponding slice recipe name in the object storage, wherein the respective local slice recipe name matching any corresponding slice recipe name in the object storage being a verified slice recipe name;

send, by the controller module, each verified slice recipe name to a selected one of a plurality of worker nodes, each of verified slice recipe names being pre-assigned to the selected one of the plurality of worker nodes, the selected worker node being pre-assigned to a similarity group identified by a respective retrieved similarity group name each of the plurality of worker nodes verifying if there is corruption in the slice recipes corresponding to the verified slice recipe names based on slice recipe metadata;

receive, by the controller module, a plurality of lists of one or more corruptions identified by each of the plurality of worker nodes, each of the plurality of lists being identified based on the verified slice recipe names sent by the controller module to each of the plurality of worker nodes;

receiving, by the controller module, notifications from each of the plurality of worker nodes that the identification of corruptions is complete for the verified slice recipe names received by the worker nodes; and collect, by the controller module, one or more corruptions identified by the controller module and the plurality of lists of one or more corruptions identified by the plurality of worker nodes in response to receiving notification from all of the plurality of worker nodes that were sent verified slice recipe names that the verification of corruptions is complete.

16. The computer program product of claim 15, wherein the program code for generating the at least one slice recipe includes further instructions to:

retrieve, by the controller module, an object part identifier in the object recipe metadata;

retrieve, by the controller module, a slice number identifier in the object recipe metadata, the slice number identifier corresponding to the object part identifier; and generate, by the controller module, a slice recipe name string that includes the retrieved object part identifier and the retrieved slice number identifier, the slice recipe name format having pre-defined object part identifier string placement and a pre-defined slice number identifier string placement.

17. The computer program product of claim 16, wherein the program code for verifying object recipe metadata used to generate a respective local slice recipe name is accurate further comprises instructions to:

retrieve, by the controller module, a list of slice recipe names from the object storage, the listed slice recipe names corresponding to a same object in a first data domain as the retrieved object recipe;

verify, by the controller module, that each slice recipe name from object storage has a matching local slice recipe name generated from the object recipe; and generate, by the controller module, a corruption identification upon detecting an inconsistency between a respective listed slice recipe name and a corresponding local slice recipe name generated from the object recipe.

18. The computer program product of claim 15, wherein the program code further comprises instructions to:

retrieve, by the controller module, prior to retrieving an object recipe from object storage, the list of similarity group names that correspond to any object in the first data domain; and send, by the controller module, the retrieved similarity group name to the select worker node.

19. The computer program product of claim 18, wherein the program code further comprises instructions to:

select, by the controller module, prior to retrieving a list of similarity group names that correspond to any object in the first data domain, a similarity group verification path instead of a slice recipe verification path based on detecting a total amount of memory taken up by a plurality of similarity groups is less than a total amount of memory taken up by a plurality of slice recipe names.

20. The computer program product of claim 18, wherein the program code for retrieving a list of similarity group names further comprises instructions to:

retrieve, by the controller module, one or more similarity group names, from object storage, that have a same data domain identifier, each similarity group name comprising a string in a similarity group name format, the similarity group name format having a data domain identifier string position.

21. The computer program product of claim 15, wherein the program code further comprises instructions to:

send, by the controller module, to each respective worker node, a corrupted objects request, the corrupted objects request requesting each corruption identified by the respective worker node; and add, by the controller module, each corruption identified by each worker node to a controller corrupted object map, the controller corrupted object map including each corruption identified by the controller module.

* * * * *